(12) United States Patent
Koivisto et al.

(10) Patent No.: US 7,516,402 B2
(45) Date of Patent: Apr. 7, 2009

(54) PRESENTATION OF LARGE OBJECTS ON SMALL DISPLAYS

(75) Inventors: Antti J. Koivisto, Cambridge, MA (US); Andrei Radu Popescu, Helsinki (FI); Guido Grassel, Espoo (FI); Virpi Roto, Espoo (FI); Roland Geisler, Cambridge, MA (US); Mikko K. Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 593 days.

(21) Appl. No.: 11/069,891

(22) Filed: Feb. 28, 2005

(65) Prior Publication Data

US 2006/0195784 A1    Aug. 31, 2006

(51) Int. Cl.
G06F 17/00 (2006.01)
(52) U.S. Cl. .................. 715/238; 715/204; 715/236
(58) Field of Classification Search ............. 715/200, 715/230, 204, 234, 236, 238, 240
See application file for complete search history.

(56) References Cited

U.S. PATENT DOCUMENTS

| | | | |
|---|---|---|---|
| 6,456,305 B1 | 9/2002 | Qureshi et al. | |
| 6,948,119 B1* | 9/2005 | Farmer et al. | 715/206 |
| 7,290,006 B2* | 10/2007 | Xie et al. | 707/102 |
| 2002/0035579 A1* | 3/2002 | Wang et al. | 707/513 |
| 2002/0091738 A1* | 7/2002 | Rohrabaugh et al. | 707/517 |
| 2002/0103697 A1* | 8/2002 | Lockhart et al. | 705/14 |
| 2002/0124023 A1* | 9/2002 | Wormley | 707/517 |
| 2002/0188527 A1* | 12/2002 | Dillard et al. | 705/27 |
| 2003/0229845 A1* | 12/2003 | Salesin et al. | 715/500 |
| 2004/0004641 A1 | 1/2004 | Gargi | |
| 2004/0049737 A1 | 3/2004 | Simon Hunt et al. | |
| 2004/0145593 A1 | 7/2004 | Berkner et al. | |
| 2005/0071364 A1* | 3/2005 | Xie et al. | 707/102 |

FOREIGN PATENT DOCUMENTS

AU        761635        5/2001

OTHER PUBLICATIONS

"Cascading Style Sheets, level 2 revision 1, CSS2.1 Specification"; W3C Candidate Recommendation Feb. 25, 2004; European Research Consortium for Informatics and Mathematics ERCIM, Keio; chapters 8 and 9, pp. 93-149.

* cited by examiner

*Primary Examiner*—Stephen S Hong
*Assistant Examiner*—Gregory J Vaughn
(74) *Attorney, Agent, or Firm*—Alfred A. Fressola; Ware, Fressola Van Der Sluys & Adolphson LLP (57) ABSTRACT

This invention relates to a method, a computer program product, a device and a system for formatting an object to obtain a formatted object, wherein the object comprises a plurality of elements, and wherein the formatted object is affected by at least one constraint, wherein the constraint is scaled by a first scaling factor to obtain a scaled constraint; wherein at least one of the elements is scaled by a second scaling factor to obtain a scaled element; wherein a layout structure is generated for the plurality of elements including the scaled element under consideration of the scaled constraint; and wherein the layout structure is scaled by a third scaling factor to obtain the formatted object.

26 Claims, 8 Drawing Sheets

Pääministeri Matti Vanhasen mukaan Suomi pitää välttämättömänä, että Holkerin seuraaja vaativaan tehtävään valitaan nopeasti.

Vanhasen mukaan Länsi-Balkanin vaikeudet voitetaan laajalla kansainvälisellä yhteistyöllä ja ennen muuta kosovolaisten omien ponnistusten avulla.

Fig.6a

Pääministeri Matti Vanhasen mukaan Suomi pitää välttämättömänä, että Holkerin seuraaja vaativaan tehtävään valitaan nopeasti.

Vanhasen mukaan Länsi-Balkanin vaikeudet voitetaan laajalla kansainvälisellä yhteistyöllä ja ennen muuta kosovolaisten omien ponnistusten avulla.

PRESENTATION OF LARGE OBJECTS ON SMALL DISPLAYS

FIELD OF THE INVENTION

This invention relates to a method, a computer program product, a device and a system for formatting an object to obtain a formatted object, wherein said object comprises a plurality of elements, and wherein said formatted object is affected by at least one size constraint.

BACKGROUND OF THE INVENTION

In modern browsers, rendering of documents such as for instance World Wide Web (WWW) documents formatted according to the Hypertext Markup Language (HTML) or derivatives thereof (such as for instance the Extensible HTML (XHTML)), is frequently based on the Cascading Style Sheets (CSS) processing model, for instance the CSS level 2 (CSS2) processing model (cf. Cascading Style Sheets, level 2 revision 1 CSS 2.1 Specification, W3C Candidate Recommendation, 25 Feb. 2004, available at www.w3.org). Style sheets represent a set of statements that specify the presentation of a document. For instance, a style sheet may uniformly define the background colour of all pages of a web document that is specified in HTML. In the CSS processing model, a user agent, for instance a browser or a part thereof, first parses a document that is to be displayed and creates a document tree that hierarchically contains the elements of said document. The user agent then identifies the target media type on which the document is to be rendered, for instance a display of a hand-held multimedia device, and retrieves style sheets associated with the document and specified for the target multimedia device. The elements in the document tree are then annotated by assigning values to properties of the respective elements that are applicable to the target media type. From the annotated document tree a formatting structure is generated in a formatting process that obeys a formatting model, for instance a visual formatting model in case of the target media type being a display. Therein, for the elements in the document tree, zero or more rectangular boxes are generated according to a CSS box model, and these boxes are then laid out according to the visual formatting model to obtain the formatting structure.

The visual formatting function that performs the formatting according to said formatting model takes as an input various internal constraints imposed by the structure and style of the document that is being processed and external constraints imposed by the browser application and environment.

Internal constraints often limit the minimum width of the boxes that make up the generated layout. For example, if a box contains an image, it cannot be narrower than the image. Similarly, if the document sets a table column to some fixed pixel width, it cannot become any narrower or wider than the specified value. Ignoring any of these constraints is a violation against the formatting model and will distort or destroy the document layout.

Currently, the most important external constraint for the formatting function is the width of the browser view port (on a desktop browser, the width of the browser window; on a mobile browser, the width of the available display area, i.e. the width of the display minus UI elements like window borders). The formatting function tries to make the formatting structure width match the view port width while still satisfying the internal constraints. If that is not possible, the formatting structure becomes wider (or narrower) than the view port width. In this case viewing the whole content of the document on a display might require sideways scrolling.

The text content of a box is formatted after the box width is determined. Still the text content provides constraints to the box width. Minimum width of a box containing text is the width of the longest word in the box. The box height, and eventually the total height of the formatting structure, is determined by the formatted height of the text content. Width and height of individual pieces of text depends on the used font and must be known during the formatting process.

Finally, said formatting structure is transferred to the target medium, for instance painted on a display. Therein, the "canvas" denotes the space where the formatting structure (with a certain area) is painted. The painting step can be repeated without reformatting the document, for example when the view position changes as a result of a user scrolling the displayed formatting structure. However, re-formatting may be required when the dimensions of the view port are changed by a user.

The view ports of hand-held multimedia devices such as mobile phones or Personal Digital Assistants (PDAs) are necessarily significantly smaller than the view ports of the computer or television screens for which documents are usually designed. If for instance content of the World Wide Web (WWW), i.e. web documents formatted, for example, in HTML or XHTML, is to be displayed on the display of a hand-held device, it has to be considered that these web documents normally have an original presentation size designed for portrayal on a computer monitor, the dimensions of which are often remarkably larger than the display of a hand-held device such as a mobile phone. As an example, the width of the display of a computer monitor is generally 800 picture elements (pixels) or more, whereas the display area on a typical hand-held multimedia device (such as for instance one of the Nokia Series 60 devices) is only 176×208 pixels.

In prior art, various methods have been developed that reformat the web document content to better fit the width of small view ports. For instance, US 2004/0049737 A1 proposes to format the web document content to selectively minimize the horizontal scrolling required to view the content on a small display. Each component or sub-component of the original area, such as a frame, table row, table cell or nested table is considered separately and may be preserved, resized or replaced. Where the context requires that the content be wider than the view port width of the display, horizontal scrolling is preserved.

This prior art approach leads to a reformatting of the entire content of the web document into a tall column (even when the original content contained more than one column) that substantially fits the width of the view port and thus requires less or no horizontal scrolling. Only components of the web document that can not be appropriately fitted to the view port width exceed said view port width and then require horizontal scrolling. The original design intent of the web document is thus destroyed and made unrecognizable to the user.

Improved methods for formatting large web documents to fit small displays should target to maintain the original document layout while making some adjustments to better fit it to the small view port. In particular, readability of text passages should be improved. Therein, some or all of the following design rules could be considered:

On the small display, substantially keep the original document layout so that the document looks generally similar to how it looks on a large display. This allows the user to navigate by location of the information on the page, which is essential also on a Personal Computer (PC).

Reduce the size of the document area so that less scrolling is needed to traverse the document.

Format larger text paragraphs so that as little as possible horizontal scrolling is required during their reading.

SUMMARY OF THE INVENTION

In view of the above-mentioned problems, the present invention proposes a method, a computer program product, a device and a system for an improved formatting of an object.

It is proposed a method for formatting an object to obtain a formatted object, wherein said object comprises a plurality of elements, and wherein said formatted object is affected by at least one constraint, said method comprising scaling said constraint by a first scaling factor to obtain a scaled constraint; scaling at least one of said elements by a second scaling factor to obtain a scaled element; generating a layout structure for said plurality of elements including said scaled element under consideration of said scaled constraint; and scaling said layout structure by a third scaling factor to obtain said formatted object.

Said object may for instance be any entity that lends itself to rendering, for instance for displaying. Said object may for instance be a document containing text, images and/or videos, or a 3D-object such as a 3D map of a town. Said object may for instance be defined in a markup language as for instance the Hypertext Markup Language (HTML), the Extensible HTML (XHTML), the Standard Generalized Markup Language (SGML) or any other markup language. Said object comprises a plurality of elements. An example for such an element is a text element, that is composed of alpha-numeric symbols, signs, symbols or any other information-carrying elements. Said text element may for instance be a block of text, like an article or a title, or a word, for instance a single entry of an enumeration, or any other type of text. Said text element may comprise text with a certain font size, i.e. a size specification for the elements (e.g. letters, symbols) of said text in absolute or relative units (for instance points, inches or pixels). Said font size may either be implicitly or explicitly defined for said text element. For instance, said font size may be a standard font size for said object or text element, or may be assigned to said text element by a style sheet that is associated with said object, or may be defined within said text element. Said text in said text element may be inline text that may be formatted by a browser in a formatting process, and is not replaced, for instance from an external source, during said formatting process. Further examples of elements comprised in said object are images, which may themselves contain text as well.

Said formatted object is affected by at least one constraint. Said constraint may for instance be a size constraint, a sharpness constraint, a resolution constraint or some other constraint, for example. As a size constraint, said constraint may for instance be related to a maximum allowable dimension of said formatted object, for instance a maximum width, height or depth. Equally well, said constraint may be imposed on said formatted object by a medium on which said formatted object is to be rendered. For instance, as a size constraint, said constraint may be related to at least one dimension of an available display area on a display, e.g. the width and/or height of a view port of a device, wherein said view port may for instance be a web page display area of a browser window on a desktop of a computer or an area on a display of a hand-held multimedia device, which area is available for displaying content.

Said constraint is scaled by a first scaling factor to obtain a scaled constraint. Said scaling may for instance be accomplished by multiplying a value representing said constraint with said first scaling factor. Therein, said first scaling factor may be fixed, adaptively determined or selected by a user.

At least one of said elements comprised in said object is scaled by a second scaling factor to obtain a scaled element. For instance, if said element is a text element, a font size of the text contained in said text element may be scaled by said second scaling factor. If said element is an image, a size of said image may be scaled. Said scaling may also be performed within said step of generating said layout structure. The choice which of said elements shall be scaled may for instance be made by a user, for instance said user may have the possibility to determine which types of elements (e.g. only text elements, or only image element) shall be scaled and which shall not be scaled. Equally well, said user may be provided with a possibility to select elements for scaling irrespective of the type of the element.

For said plurality of elements of said object, i.e. said at least one scaled element and said other elements, then a layout structure (e.g. a formatting structure in the context of CSS2) is generated under consideration of said scaled constraint. Said generating of said layout structure may for instance be performed according to a visual formatting model and may try to arrange boundaries (for instance boxes) that represent said elements of said object on a (virtual) canvas in a way that internal constraints imposed by said elements and external constraints such as a view port size are met, while still preserving an original layout designed for said objects as much as possible. In said generating of said layout structure, said scaled constraint is considered. In the exemplary case that said constraint is a size constraint, it may for instance be targeted that said layout structure does not exceed a width and/or height defined by said scaled constraint; however, exceeding of said width and/or height defined by said constraint may nevertheless be allowed when this exceeding contributes to an improved formatting of said object.

To obtain said formatted object, said layout structure is scaled by a third scaling factor. This step of scaling said layout structure by said third scaling factor may for instance be performed together with said step of generating said layout structure, for instance both steps may be performed by the same instance. Said formatted object then may for instance be displayed on a display, or stored in a storage medium, or exchanged between devices.

According to the present invention, at least one element comprised in said object is scaled by said second scaling factor, and said generating of said layout structure is performed for said scaled element and said other (unscaled) elements of said object. Said scaling of said at least one element allows to modify a property of said at least one element, such as for instance the size, sharpness, resolution, or similar, relative to the respective property of the other elements of said object. In said generating of said layout structure, instead of said constraint, said scaled constraint is considered, which can be influenced by said first scaling factor. This allows, in said generating of said layout structure, to at least partially account for the scaling of said at least one element by said second scaling factor. Finally, said third scaling factor, which is applied to said layout structure, allows to at least partially compensate for the modification of said constraint by said first scaling factor.

As an example, if said at least one element of said object is a text element of a page, if said constraint is a size constraint defining an available display area for said page and if it is desired that the size of said text element is relatively increased with respect to the other elements comprised in said page (or in other words, the size of said other elements is reduced with respect to said text elements), said first and second scaling factor may be chosen to be equal and larger than one, and the third scaling factor then may be chosen as a reciprocal value of said first and second scaling factor. The effect of this choice is that the text element then is scaled to a larger size with respect to the other elements in said page. From this scaled text element and the other (unscaled) elements of said page, a layout structure is generated under consideration of an increased size constraint, i.e. it is assumed during the generating of said layout structure that a larger display area is available. To account for this assumption when actually displaying the layout structure, the layout structure is scaled by the third scaling factor prior to the displaying, yielding a scaled layout structure. With the third scaling factor being chosen as the reciprocal value of the first and second scaling factor, it is readily clear that, in the scaled layout structure, the size of the text element remains unchanged, whereas the size of the other elements, that were not scaled by the second scaling factor, is scaled down. This significantly reduces the area of the layout structure and thus reduces the need for scrolling, while only insignificantly changing both the size (and readability) of the text element and the layout of the page, as the coarse relative positioning of elements of said page is not affected.

According to a further embodiment of the method of the present invention, said first and second scaling factors are larger than one, and said third scaling factor is smaller than one.

Said first scaling factor then allows for an appropriate layout of said elements of said object and in particular said scaled element, and the third scaling factor enables that less scrolling may be required when said formatted object is displayed on a display.

According to a further embodiment of the method of the present invention, said first and second scaling factors are substantially equal, and said third scaling factor is substantially a reciprocal value of said first scaling factor.

In effect, said at least one element is thus scaled by a factor and then scaled by the reciprocal value of said factor again, so that said at least one element effectively remains unscaled, whereas the other elements comprised in said object are scaled. The choice of the first and second scaling factors being substantially equal enables that there is enough space for the layout of said scaled element if said first and second scaling factors are larger than one.

According to a further embodiment of the method of the present invention, said first scaling factor is a product of a fourth and fifth scaling factor, and wherein said fourth scaling factor is substantially a reciprocal value of said third scaling factor.

Splitting said first scaling factor into two scaling factors adds an additional degree of freedom to the formatting technique of the present invention, wherein said fourth scaling factor being a reciprocal value of said third scaling factor allows for the above-described formatting technique that scales the other elements of said object with respect to the (effectively unscaled) at least one element. However, the fifth scaling factor allows to relax the constraint that is considered in said generating of said layout structure independent of the scaling of the elements of said object. In this way, for instance a size of said formatted object as produced by said formatting technique can be independently adjusted, which is particularly advantageous if the constraint (which then may be a size constraint) is too limiting to allow for a proper displaying of said object on a display area even if said scaling of said elements is applied. For example, if said constraint is a size constraint related to a width of a display area on a display, by choosing said fifth scaling factor larger than one, it is achieved that formatting of said object is performed as if said width of said display area was wider, and correspondingly, said formatted object generated by said formatting may no longer horizontally fit into said display area, so that horizontal scrolling is required. However, the inconvenience caused to a user by said horizontal scrolling may by far be outweighed by the improved rendering of said formatted object to a larger width.

Said fifth scaling factor may for instance at least partially depend on said fourth scaling factor. Said fifth scaling factor may then for instance be a linear or non-linear function of said fourth scaling factor.

Equally well, said fifth scaling factor may be selected by a user. Said user may for instance use a user interface like a menu item, control buttons, a speech control interface, a control wheel or a similar user interface to input or change said fifth scaling factor. Feed-back on his choice then may be instantly provided on a display area of a display that displays said formatted object according to the selected fifth scaling factor, so that a choice that most optimally fits the user's needs may be interactively determined.

Said fifth scaling factor may also be adaptively determined for said object. Said fifth scaling factor may for instance be determined by some instance that adaptively analyses said object and/or said formatted object generated by said formatting in order to determine a suited value for said fifth scaling factor.

At least said scaling of said constraint by said first scaling factor and said generating of said layout structure under consideration of said scaled constraint may be repeated in at least two iterations, and in said iterations, different values for said fifth scaling factor may be used.

Then after an iteration, said layout structure may be inspected by an instance or a user to determine whether further iterations are required to achieve a more improved layout structure or not.

Said iterations may for instance be performed until a pre-defined criterion for said layout structure is met, and a representation of a layout structure generated in at least one of said iterations may at least partially be displayed on said available display area on said display.

Said change of said fifth scaling factor in an iteration may be a linear or non-linear increase of decrease, and may be linked with said pre-defined criterion or not. From the above description related to said fifth scaling factor, it is readily understood that the use of said first scaling factor in order to relax a constraint that affects said formatted object may also be advantageously deployed when no scaling of said at least one element (by said second scaling factor) and of said layout structure (with said third layout factor) is performed at all. The layout structure then is generated based on the original (unscaled) elements of said object, and is not scaled with said third scaling factor, so that it represents the formatted object. However, due to the relaxing of said constraint, which affects said formatted object and is considered during the generating of said layout structure, an improvement of the formatted object may be achieved.

According to a further embodiment of the method of the present invention, said generating of said layout structure comprises determining a boundary for said scaled element; checking if a dimension of said boundary violates a limit defined by said scaled constraint; and formatting a content of said scaled element to said limit defined by said scaled constraint, if said dimension of said boundary violates said limit defined by said scaled constraint.

Therein, said violation of said limit may for instance either refer to the case that said limit is an upper limit for said dimension, wherein said dimension then is understood to violate said limit by being larger than said upper limit, or to the case that said limit is a lower limit, wherein said dimension then is understood to violate said limit by being smaller than said lower limit. Said at least one element may for instance be a text element that contains text as a content, said boundary may for instance be a box, and said dimension of said box may for instance be a width of said box. In this case, then said limit defined by said scaled constraint may for instance be a width of a display area on which said formatted object may be displayed. According to this embodiment of the present invention, if said width of said box exceeds said width defined by said scaled size constraint (i.e. violates said limit defined by said scaled constraint), a representation of said box in said formatted object may not completely fit into said display area of said display when said formatted object is displayed on said display, so that horizontal scrolling is required to view said representation of said box completely. Formatting said text of said text element to the width of said box would then require horizontal scrolling in every line of said text in said representation of said box contained in said formatted object, which may be experienced as annoying by a user when reading said text. Instead, this embodiment of the present invention thus proposes to format the text in said box to said width defined by said scaled constraint, which is smaller than the width of said box. If said width defined by said scaled constraint is a width of said display area of said display, then said text in said representation of said box appears on said display area formatted to said width of said display area. Thus although said representation of said box exceeds said width of said display area, said text in said representation of said box can be read without requiring horizontal scrolling.

If said content is text, said formatting of said content may be performed by word-wise inserting text into lines of said boundary and wrapping around said text when inserting a further word into a line would cause a length of said line to exceed said limit defined by said scaled constraint.

Depending on the direction of reading, said word-wise inserting may be performed from left-to-right or from right-to-left.

Said content may further comprise components that are replaced when said layout structure is generated, and then, in a case when more than a predefined number of said components have already been inserted into a line of said boundary, said wrapping around for said respective line may be performed when inserting a further word or component into a line would cause a length of said line to exceed said dimension of said boundary.

It may also be advantageous that, in case said content further comprises components that are replaced when said layout structure is generated, and in a case when a sum of respective lengths of said components that have already been inserted into a line of said boundary exceeds a pre-defined length threshold, said wrapping around for said respective line may be performed when inserting a further word or component into a line would cause a length of said line to exceed said dimension of said boundary.

Then, instead of binding said formatting of said content to said limit defined by said scaled size constraint or to said dimension of said boundary to said predefined number of said components, also the length of said components may be considered, which is particularly advantageous if said components have different lengths.

Said plurality of elements comprised in said object may be arranged in a tree structure, and wherein in a case when said at least one element (that is scaled by said second scaling factor) is a text element and when a parent element of said text element in said tree structure is not a text element, said wrapping around for said respective line is performed when inserting a further word or component into a line would cause a length of said line to exceed said dimension of said boundary.

It is readily understood that this embodiment of the present invention is functional and advantageous even if no scaling of said constraint by said first scaling factor, no scaling of said at least one element by said second scaling factor and no scaling of said layout structure by said third scaling factor is performed.

According to a further embodiment of the method of the present invention, in said generating of said layout structure, a hyphenation algorithm is applied to a text contained in said at least one element that is scaled by said second scaling factor.

Said hyphenation particularly contributes to reduce the height of said at least one element (containing said text) in said layout structure. For instance, if said at least one element is a box with fixed width into which said text is formatted, said box may grow quite long when no hyphenation is performed, and a lot of space in said box will remain empty. Furthermore, the length of the longest word in said text may determine the width of the box, which may significantly reduce the degrees of freedom in generating said layout structure. Said hyphenation may for instance be implemented in the same device that implements the generating of said layout structure, for instance a hand-held multimedia device. Said hyphenation may comprise detecting a language of said text in said at least one element, detecting possible hyphenation points in the words of said text, and deciding when to apply said hyphenation.

Hyphenation may for instance be implemented by marking possible hyphenation points in said text of said at least one element prior to said generating of said layout structure for said plurality of elements, and in said generating of said layout structure, it may be decided when text is wrapped at said marked hyphenation points.

Said detection of possible hyphenation points in the words of said text may also be performed by a hyphenation instance that is different from a generating instance that performs said generating of said layout structure. Said hyphenation instance may for instance be located in a server of a network, and said generating instance may be located in a client of said network.

It is readily understood that this embodiment of the present invention is functional and advantageous even if no scaling of said constraint by said first scaling factor, no scaling of said at least one element by said second scaling factor and no scaling of said layout structure by said third scaling factor is performed.

According to a further embodiment of the method of the present invention, said generating of said layout structure for said plurality of elements is at least partially defined by a style sheet. Said style sheet may for instance be a set of statements specifying a presentation of said object. Said style sheet may for instance obey the CSS2 standard.

According to a further embodiment of the method of the present invention, said object is a document, and said elements of said document are defined by a markup language. Said markup language may for instance be HTML, XHTML, SGML or any other markup language.

It is further proposed a device for formatting an object to obtain a formatted object, wherein said object comprises a plurality of elements, and wherein said formatted object is affected by at least one constraint, said device comprising means arranged for scaling said constraint by a first scaling factor to obtain a scaled constraint; means arranged for scaling at least one of said elements by a second scaling factor to obtain a scaled element; means arranged for generating a layout structure for said plurality of elements including said scaled element under consideration of said scaled constraint; and means arranged for scaling said layout structure by a third scaling factor to obtain said formatted object.

According to an embodiment of the device of the present invention, said device is a mobile phone or a part thereof. Said device may also be a PDA, a similar hand-held multimedia device, a computer or any other electronic device.

According to an embodiment of the device of the present invention, said means arranged for generating said layout structure comprises means arranged for determining a boundary for said scaled element; means arranged for checking if a dimension of said boundary violates a limit defined by said scaled constraint; and means arranged for formatting a content of said scaled element to said limit defined by said scaled constraint, if said dimension of said boundary violates said limit defined by said scaled constraint.

According to an embodiment of the device of the present invention, said means arranged for generating said layout structure comprises means arranged for applying a hyphenation algorithm to a text contained in said at least one element that is scaled by said second scaling factor.

It is further proposed a computer program product comprising a computer program with instructions stored on a readable medium, the instructions operable to cause a processor to perform the above-described method steps. Said computer program product may for instance be inserted into a hand-held multimedia device or any other electronic device that acts as an interface between a user and a content network, as for instance an internet, intranet or extranet.

According to an embodiment of the computer program product of the present invention, said computer program is related to a browsing application or to a part thereof.

It is further proposed a system for formatting an object to obtain a formatted object, wherein said object comprises a plurality of elements, and wherein said formatted object is affected by at least one constraint, said system comprising means arranged for scaling said constraint by a first scaling factor to obtain a scaled constraint; means arranged for scaling at least one of said elements by a second scaling factor to obtain a scaled element; means arranged for generating a layout structure for said plurality of elements including said scaled element under consideration of said scaled constraint; and means arranged for scaling said layout structure by a third scaling factor to obtain said formatted object.

According to an embodiment of the system of the present invention, said means are jointly implemented by a network element and a mobile phone in a mobile radio communications network. Said network element may reside in a radio access network or in a core network of said mobile radio communications network.

These and other aspects of the invention will be apparent from and elucidated with reference to the embodiments described hereinafter.

DETAILED DESCRIPTION OF THE INVENTION

The present invention proposes a method for formatting an object to obtain a formatted object, wherein said object comprises a plurality of elements, and wherein said formatted object is affected by at least one constraint, said method comprising scaling said constraint by a first scaling factor to obtain a scaled constraint; scaling at least one of said elements by a second scaling factor to obtain a scaled element; generating a layout structure for said plurality of elements including said scaled element under consideration of said scaled constraint; and scaling said layout structure by a third scaling factor to obtain said formatted object.

In the following detailed description of the invention, embodiments of the present invention will be presented, wherein an exemplary deployment of the present invention in the context of a browser in a hand-held multimedia device is chosen, and wherein said browser applies a processing model, such as for instance the Cascading Style Sheet level 2 (CSS2) processing model or a derivative thereof, to format and display said object. Therein, said object is then identified as a web document, said at least one element that is scaled by said second scaling factor is exemplarily chosen to be a text element of said web page that comprises text with a certain font size, said layout structure is identified as the formatting structure that is generated by a visual formatting model, said formatted object is identified as the scaled formatting structure that is obtained by scaling said formatting structure by said third scaling factor, and said constraint is identified as the external width and height constraint of the view port of the hand-held multimedia device, i.e. the width and height of the available display area of a display of said device.

It is understood that the description in the opening part of this specification is suited to support this detailed description of the invention and is thus incorporated into this detailed description by reference.

Figure 1:
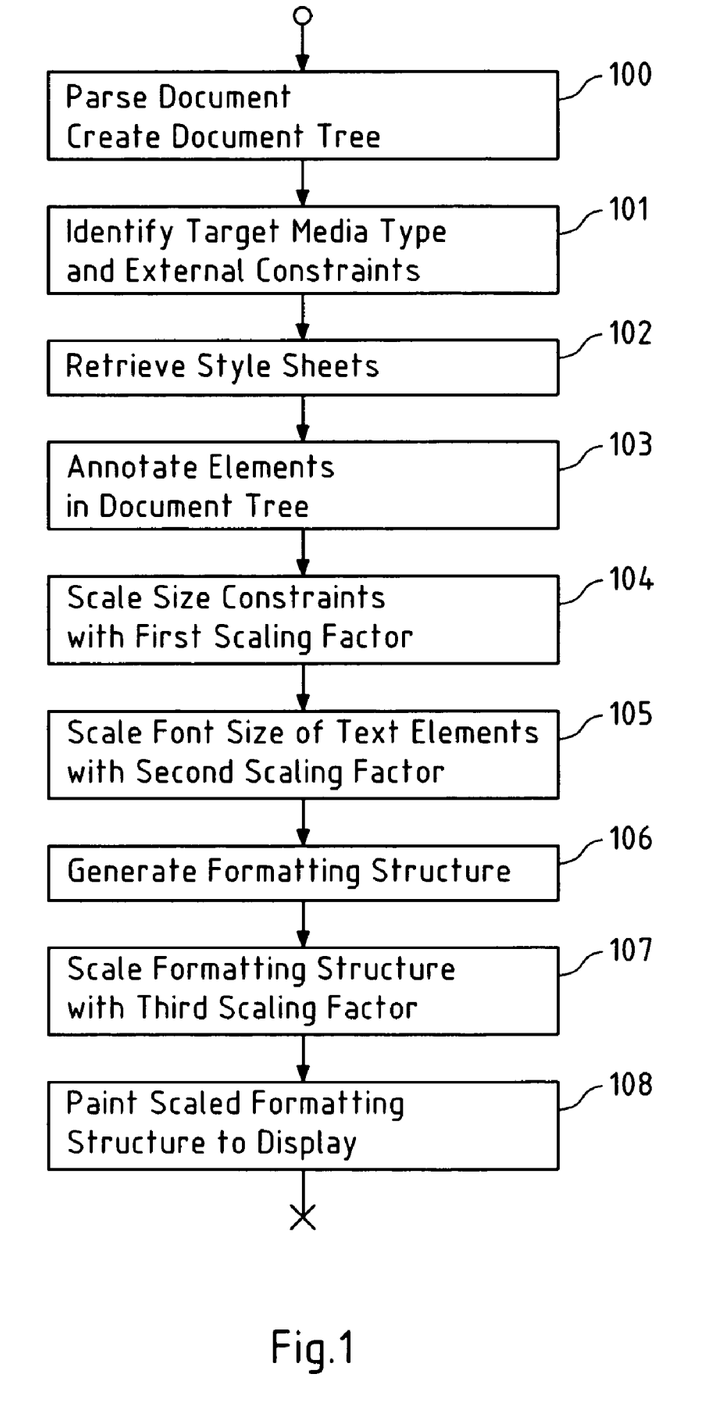
FIG. 1: A flowchart according to a first embodiment of the present invention.

FIG. 1 depicts a flowchart of a first embodiment of the present invention. The steps of this flowchart may for instance be performed by a browser in a hand-held multimedia device (e.g. a mobile phone or a PDA) to render a document (e.g. an internet document written in HTML) on the display of said device.

In a first step 100, the browser parses the document and generates a document tree, in which the elements of the document, e.g. images, texts, or similar elements, are hierarchically arranged.

In a second step 101, the browser then identifies the target media type to which said document is to be rendered, which in this exemplary case is the display of said hand-held multimedia device. The browser also identifies the external constraints associated with said target media type. In case of a display as target media type, said external constraints are size constraints of an available display area (also denoted as view port) on said device, in particular the width and height of said available display area.

In a step 102, the browser then retrieves the style sheets that are associated with said document. Said style sheets may be either embedded into said document or be stored separately.

In a step 103, the browser then annotates the document tree by assigning values to properties of the elements in said document tree that is applicable to the target media type. For instance, a text element may be assigned with a colour and/or text font and/or font size.

According to the present invention, then in a step 104, said external width and height constraints related to said available display area are scaled by a first scaling factor, for instance a factor of two. Therein, it should however be noted that it is also possible to use different scaling factors for the width and height, respectively.

Similarly, in a step 105, the font size of text elements in the annotated document tree is scaled by a second scaling factor, which in this exemplary embodiment is considered to equal said first scaling factor. The scaling of the font size may for instance be accomplished by multiplying the text metrics, i.e. the calculated width and height of the text strings in the text elements, by the scaling factor. It should be noted that this step may be performed before or during the formatting process (see step 106).

In step 106, a formatting structure is generated from the annotated document tree in a formatting process under consideration of the scaled font sizes of the text elements and under consideration of the scaled size constraints. In this formatting process, a formatting model (e.g. the CSS2 formatting model) is obeyed. For an element in the annotated document tree, a rectangular box is created according to a box model (e.g. the CSS2 box model), and said boxes are then arranged on the canvas in a way that said scaled size constraints are observed as well as possible. For instance, it may be envisaged to arrange the boxes so that the formatting structure does not exceed the area defined by the scaled size constraints. In the formatting process of step 106, constraints that depend on the font size are calculated using the scaled font sizes. For example, if said second scaling factor is two, a text string with (original) measured width 150 px and height 12 px is treated as a string of width 300 px and height 24 px (wherein px denotes a picture element (pixel)).

In a step 107, the formatting structure is then scaled by a third scaling factor, which in this exemplary embodiment is chosen as a reciprocal value of said first scaling factor, i.e. amounts 0.5. In said scaling, coordinates and sizes calculated for said formatting structure in step 106 are multiplied with said third scaling factor.

These scaled-down coordinates and sizes of said formatting structure are then used for painting to the display in step 108. For example, if said third scaling factor is 0.5, an image of size 100 px×100 px at formatted coordinate (0 px, 300 px) will be painted as image of 50 px×50 px at coordinate (0 px, 150 px).

It is readily understood that the step 107 (scaling of the formatting structure), instead of forming a separate step, may equally well be an integral part of step 108 (painting of scaled formatting structure to the display). In this case, no intermediate scaled formatting structure may be generated at all, and, instead, said formatting structure generated in said step 106 is directly painted to the display, wherein within this painting operation, then the scaling of the formatting structure with the third scaling factor is performed. Equally well, said step 107 may be an integral part of step 106.

According to the present invention, as the font sizes were first scaled up in step 105 and are then scaled down again in step 107, the texts of said document are actually displayed in step 108 using the original font size (as originally prescribed by the document or the style sheet). The sizes of the other elements of said document were not up-scaled by said second scaling factor in step 105. As the formatting structure is scaled down in step 107 without differentiation between text elements and other elements of said document, the size of the text in said scaled formatting structure is thus increased relative to the size of the other elements. Therein, the scaling of the size constraints with said first scaling factor in step 104 ensures that the substantial layout of the page is not changed by the increased font size.

By the scaling operations performed in steps 104, 105 and 107, the height of the scaled formatting structure may increase as compared to the height of the formatting structure that would be generated without said scaling. This is due to the fact that the font size in the scaled formatting structure is bigger relative to the other elements in the scaled formatting structure, so that less text fits into a single line.

By the scaling operations, the width of the scaled formatting structure decreases compared to the width of the formatting structure that would be generated without scaling. This decrease is generally less than the third scaling factor would imply, because in the formatting process, the minimum constraints imposed by the scaled font sizes are actually increasing compared to the other constraints.

Also the area of the scaled formatting structure decreases with respect to the area of the formatting structure that would be generated without scaling. This is due to the fact that in both formatting structures, the text substantially requires as much space as it originally did, but decreasing size of all other elements of said object makes the overall area of the scaled formatting structure smaller.

As a result, this first embodiment of the present invention allows to reduce the width and the area of the scaled formatting structure that is displayed on the display of the hand-held multimedia device while maintaining the font size as originally defined for said document. This vastly reduces the required amount of scrolling in both horizontal and vertical directions when said scaled formatting structure is displayed on said display while still maintaining the basic layout of the document.

It should be noted that the first embodiment of the present invention fully respects prior art formatting models, in particular the CSS2 formatting model. From the formatting model point of view, the first embodiment of the present invention is just a matter of using a larger font size than specified, which is legal according to the CSS2 formatting model. Furthermore, output time scaling does not affect the formatting model, and in particular, the document maintains is original look and feel.

Figure 2A:
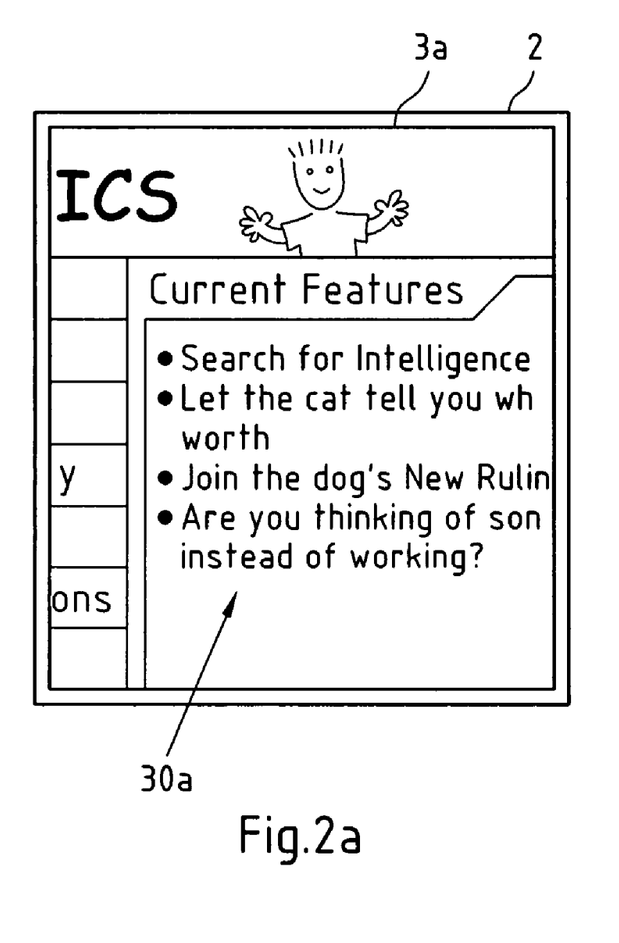
FIG. 2a: an exemplary illustration of the displaying of a formatting structure that is generated without scaling.
Figure 2B:
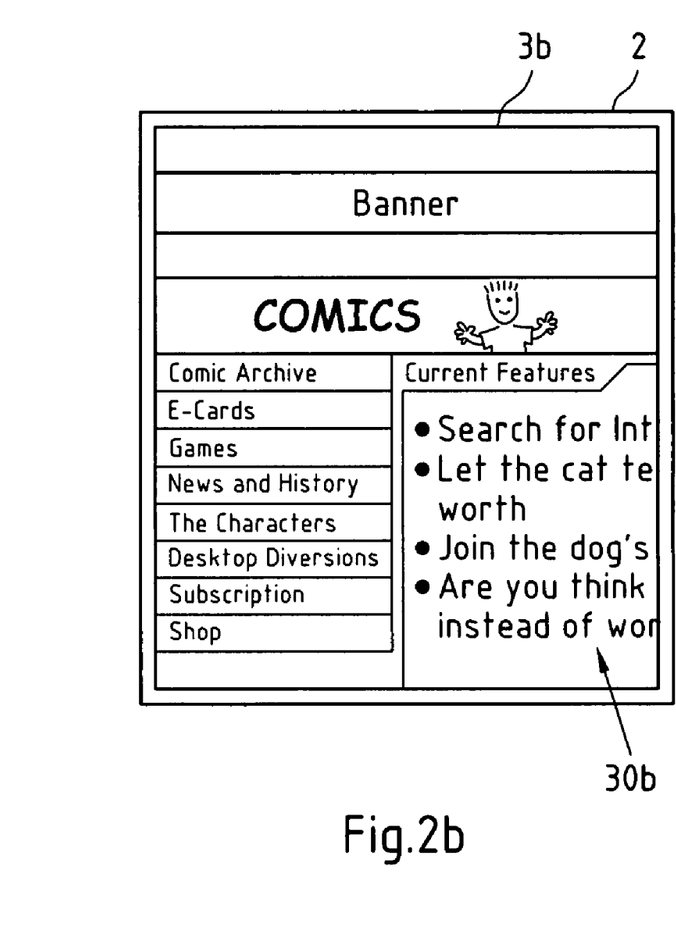
FIG. 2b: an exemplary illustration of the displaying of a formatting structure scaled according to the first embodiment of the present invention.

FIGS. 2a and 2b depict an example of the reduction of the width of an area of the scaled formatting structure that is achieved by the first embodiment of the present invention. Therein, FIG. 2a depicts a portion of a formatting structure 3a that is generated without scaling (or with the first, second and third scaling factor set equal to one) and then displayed on the display 2 of a hand-held multimedia device. FIG. 2b depicts a portion of a scaled formatting structure 3b that is generated for the same document as the formatting structure 3a of FIG. 2a, but now with scaling according to the first embodiment of the present invention (with the first and second scaling factors equalling two, and the third scaling factor equalling 0.5). As can be seen by comparing the text elements 30a and 30b (comprising inline text) in FIGS. 2a and 2b, respectively, it is evident that the texts in both text elements have the same font size. It is also readily seen that, with respect to the formatting structure 3a of FIG. 2a, in the scaled formatting structure 3b of FIG. 2b, the size of the text 30b has been increased relative to the other elements in the formatting structure 3b. This leads to an overall compression of the area required by the scaled formatting structure 3b compared to the area required by the formatting structure 3a while not affecting the size of the text in the text element 30b. Therein, it should be noted that the preservation of the font size may be applied to inline text, i.e. text that is formatted by the browser, and not necessarily to text that is comprised in images. In FIGS. 2a and 2b, only the text elements 30a and 30b represent such inline text, whereas all other elements of the document, for instance the banner with the word "COMICS" or the fields of the navigation console ("CURRENT FEATURES", "COMIC ARCHIVE", . . . , "SHOP") represent images the size of which is not preserved during the scaling operations.

A second embodiment of the present invention proposes to represent said first scaling factor that scales said size constraints by a product of a fourth and a fifth scaling factor. Therein, said fourth scaling factor may be chosen as a reciprocal value of said third scaling factor, so that the formatting of a document as in the first embodiment of the present invention is basically unaffected, apart from the fact that the formatting is performed under consideration of scaled size constraints and that the effect of said scaling of said size constraints with said first scaling factor (i.e. said fourth and fifth scaling factors) is not revoked by said scaling of said formatting structure by said third scaling factor. In fact, the size constraints considered during said generating of said formatting structure then can be independently adjusted by said fifth scaling factor.

The rationale behind this approach is that the formatting model (e.g. the CSS2 formatting model) tries to make the scaled formatting structure fit the width of the available display area. The physical width of the available display area, i.e. the view port width of the display, thus acts as a constraint to the formatting process. On small displays, this constraint may make some rendered documents so narrow that the content suffers and the design intent of the page author is lost. To prevent this, in the formatting process, the size constraint may be detached from the physical width of said available display area by accordingly choosing said fifth scaling factor larger than one. However, the scaled formatting structure generated by said formatting model then may of course no longer fit the physical width of the display area.

The value of said fifth scaling factor may be either a constant that is as small as possible but known experimentally to be non-distorting for most documents, or it may depend on the applied fourth scaling factor, or it may be selected by a user via a menu, control buttons, a control wheel, or via similar interaction techniques.

It is also possible that a browser or any other instance in said hand-held multimedia device adaptively determines said fifth scaling factor on a per-document basis. Some possibilities on how to decide a suitable value could for instance be:
- If there are horizontally overflowing text boxes in said scaled formatting structure after the formatting process, choose a larger value for said fifth scaling factor (i.e. widen the size constraint) and reformat.
- If a major block of text content in the scaled formatting structure gets formatted (much) narrower than the width of the available display area, increase the value of said fifth scaling factor and reformat.
- If there are no side-by-side boxes in the scaled formatting structure after the document has been loaded and formatted, assume wide constraint, reformat to screen width (i.e. make the page narrower).

Since the optimal formatting constraints for a web document rarely change, the constraint information (i.e. said fifth scaling factor) could be cached on a per-URL (Uniform Resource Locator) basis to lessen the need for reformatting during web document loading.

Figure 3A:
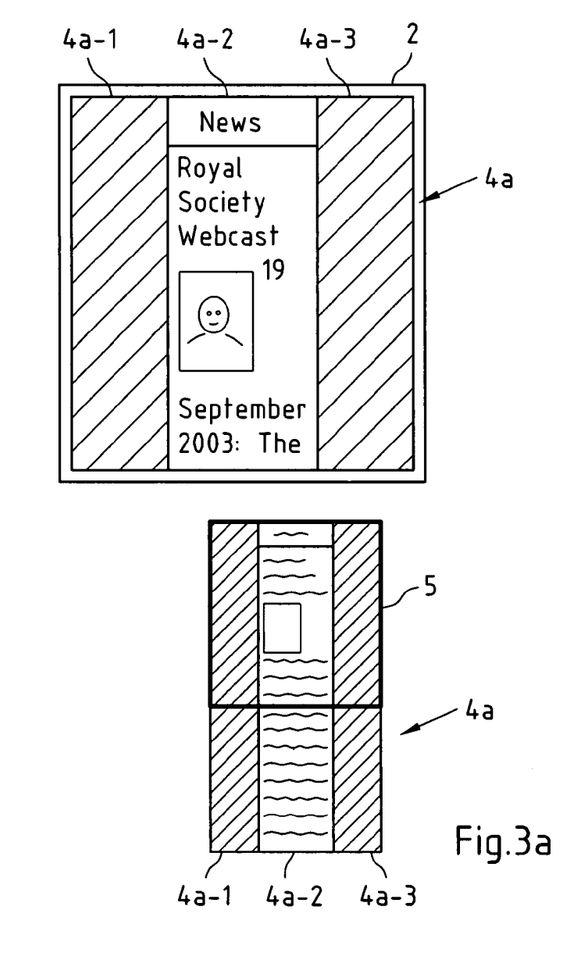
FIG. 3a: an exemplary illustration of the displaying of a scaled formatting structure that is formatted under consideration of a physical size constraint.
Figure 3B:
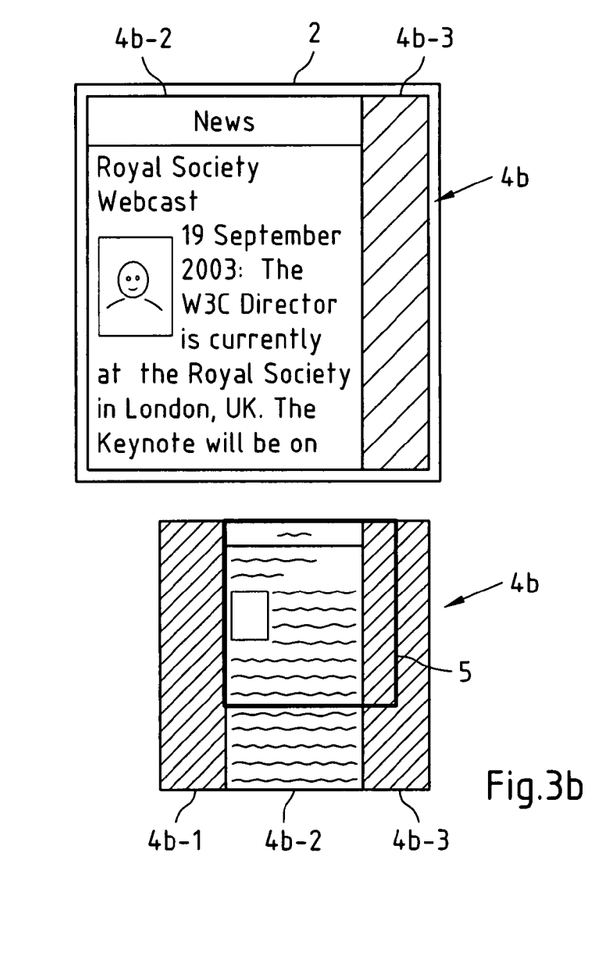
FIG. 3b: an exemplary illustration of the displaying of a scaled formatting structure that is formatted under consideration of a relaxed physical size constraint according to a second embodiment of the present invention.

FIGS. 3a and 3b illustrate the effect that can be achieved when a size constraint is relaxed by detaching the size constraint from the physical width of the available display area according to the second embodiment of the present invention. Therein, it is assumed that the second and fourth scaling factors are equal, and that said third scaling factor is a reciprocal value of said second and fourth scaling factor. Equally well, all of said second, third and fourth scaling factors may be equal to one.

In the upper part of FIG. 3a, a portion of a scaled formatting structure 4a is displayed on the available display area of a display 2. Said scaled formatting structure 4a comprises three columns 4a-1, 4a-2 and 4a-3, of which only the centre column 4a-2 is shown in more detail. The complete scaled formatting structure 4a is depicted in smaller scale in the lower part of FIG. 4a.

Therein, also the portion of said scaled formatting structure 4a that is displayed in the display area 2 (see upper part of FIG. 3a) is indicated by the bold frame 5. As can be readily seen from FIG. 3a, the scaled formatting structure has been rendered to fit the width of the available display area, i.e. said fifth scaling factor has been chosen equal to one, and the scaled size constraint that is considered during the formatting process then equals the width of said available display area, scaled by said fourth scaling factor only, wherein the influence of said scaling is revoked later by scaling the formatting structure with the third scaling factor that is a reciprocal value of said fourth scaling factor. As can be seen from the centre column 4a-2, due to lack of space, the text in said centre column 4a-2 had to be rendered to a small column width and thus is only poorly readable.

The upper part of FIG. 3b depicts a portion of a scaled formatting structure 4b that is displayed on the available display area of the same display 2 as in FIG. 3a. However, in contrast to the scaled formatting structure of FIG. 3a, where said fifth scaling factor was chosen equal to one, for the generation of the scaled formatting structure 4b of FIG. 3b, a fifth scaling factor that is larger than one was chosen in order to relax the size constraint imposed on the formatting process. This choice of the fifth scaling factor has the effect that the scaled formatting structure 4b does no longer fit the width of the available display area 2, so that scrolling is required, as can be seen from the small-scale representation of said scaled formatting structure 4b in the lower part of FIG. 3b, wherein said bold frame 5 again indicates the portion of said scaled formatting structure 4b that is displayed in the available display area 2. However, as can be seen from the centre column 4b-2 in the upper part of FIG. 3b, now more space was available in the formatting process of said scaled formatting structure 4b, so that the text contained in said centre column 4b-2 now is better formatted and easier to read. For completeness of presentation, it should be noted that the value that was chosen for the fifth scaling factor in FIG. 3b may be determined by comparing the width of the scaled formatting structure 4b (see lower part of FIG. 3b) with the width of the scaled formatting structure 4a (see lower part of FIG. 3a).

In the second embodiment of the present invention as described above and illustrated in FIGS. 3a and 3b, it was assumed that this second embodiment is set on top of said first embodiment, i.e. that the size constraint is first scaled by a first scaling factor (consisting of a fourth and fifth scaling factor), that the font sizes are scaled by a second scaling factor and that the formatting structure is then scaled by a third scaling factor. The impact of the second embodiment of the present invention then could be shown by generating the formatting structure one time with a fifth scaling factor equalling one (as in the first embodiment), leading to the scaled formatting structure 4a depicted in FIG. 3a, and one time with a fifth scaling factor being larger than one, leading to the scaled formatting structure 4b depicted in FIG. 3b. However, it is readily understood that the core idea of this second embodiment of the present invention can also be applied if no scaling in the sense of the first embodiment of the present invention is performed at all, as it is the case in prior art (corresponding to the case when the second, third and fourth scaling factors are equal to one), and then only the fifth scaling factor is used as a stand-alone scaling factor to relax the size constraint that is considered during the formatting process.

Document rendering according to the first and second embodiment of the present invention above works well in most web documents, but may not guarantee that text of all text elements of said document is formatted to a width that is equal to or smaller than the width of the available display area and thus readable without requiring horizontal scrolling. This problem is overcome by the third embodiment of the present invention, which will be presented in the following.

Figure 4A:
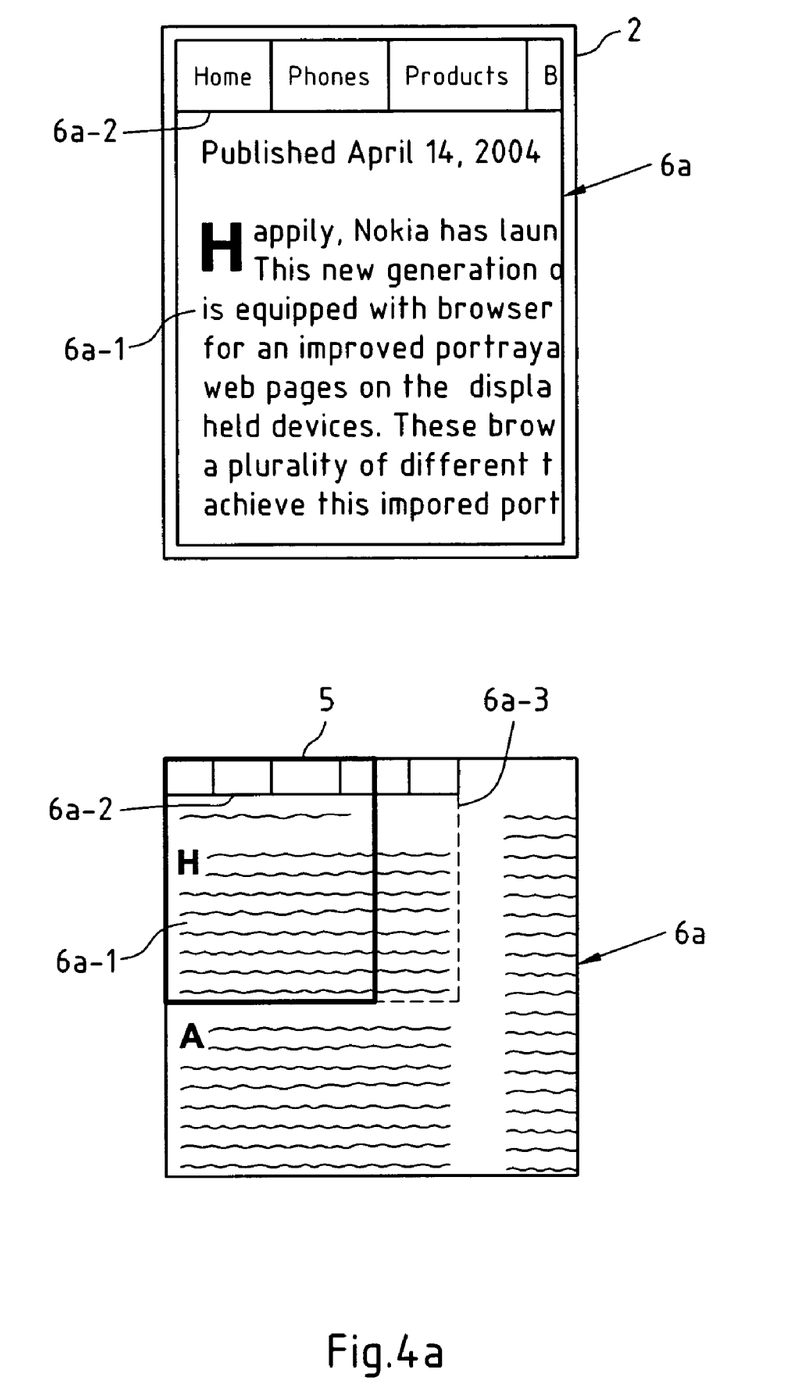
FIG. 4a: an exemplary illustration of the displaying of a scaled formatting structure with a text element.

The upper part of FIG. 4a depicts a portion 6a-1 of a scaled formatting structure 6a that is displayed in the available display area 2 of a display. Said scaled formatting structure 6a may for instance have been generated by a formatting process. The lower part of FIG. 4a illustrates the complete scaled formatting structure 6 in small scale, wherein the portion 6a-1 that is displayed in the available display area 2 of the display in the upper part of FIG. 4a is indicated by the bold frame 5. Said scaled formatting structure 6a contains a navigation element 6a-2. Said navigation element 6a-2 is a horizontal link menu consisting of a plurality of table cells, comprising short text ("Home", "Phones", "Products", etc.). Therein, said table cells serve as navigation hyperlinks. The text in said table cells is inline text, i.e. it is formatted by the browser.

The minimum width of this kind of navigation element 6a-2 is limited by the minimum text width constraints of the text in its table cells (the width of the navigation element 6a-2 can not be smaller than the sum of the widths of all table cells, which in turn are determined by the text width of said texts comprised therein). Said navigation element 6a-2 will not get any narrower when the document rendering algorithms according to the first and second embodiment of the present invention are applied.

Elements similar to the navigation element 6a-2 of FIG. 4a can limit the minimum width of the entire formatting structure and thus leave some wide columns in said formatting structure. Said wide columns then may lead to the formatting of text to the width of these wide columns, which in turn requires horizontal scrolling to read this text. This is for instance the case in FIG. 4a. As can be seen from the lower part of FIG. 4a, said navigation element 6a-2 causes a wide left column in said scaled formatting structure 6a. Correspondingly, for the text element (corresponding to said portion 6a-1) below said navigation element 6a-2, a text box 6a-3 (in dashed lines) is created with a width that is larger than the width of the available display area 2. During the formatting process, the text is then formatted to the width of this text box 6a-3, and thus scrolling is required to read the text, as can be seen from the upper part of FIG. 4a.

The third embodiment of the present invention targets that a user does not need to scroll sideways to read multi-line text paragraphs. To this end, the inline layout algorithm (e.g. the CSS2 inline layout algorithm), which is performed within the formatting process, is modified so that inline text is formatted to the width defined by the scaled size constraint (e.g. the width of the available display area or view port scaled by said first scaling factor), if said width defined by the scaled size constraint is narrower than the width of a box that is determined for a text paragraph during the formatting process according to a box model, for instance the CSS2 box model. This approach aims at ensuring that text is formatted to the width defined by the scaled size constraint, even if the text box generated for said text during the formatting process is wider than said width defined by said scaled size constraint.

The third embodiment of the present invention breaks formatting models as for instance the CSS2 formatting model, thus it should be applied carefully to avoid destroying document structure, particularly as the same inline layout algorithm may be used for all inline content, including text and images. The simplest approach is to format only lines to the width defined by said scaled size constraint if said lines are completely composed of text and do not contain other elements.

Figure 5:
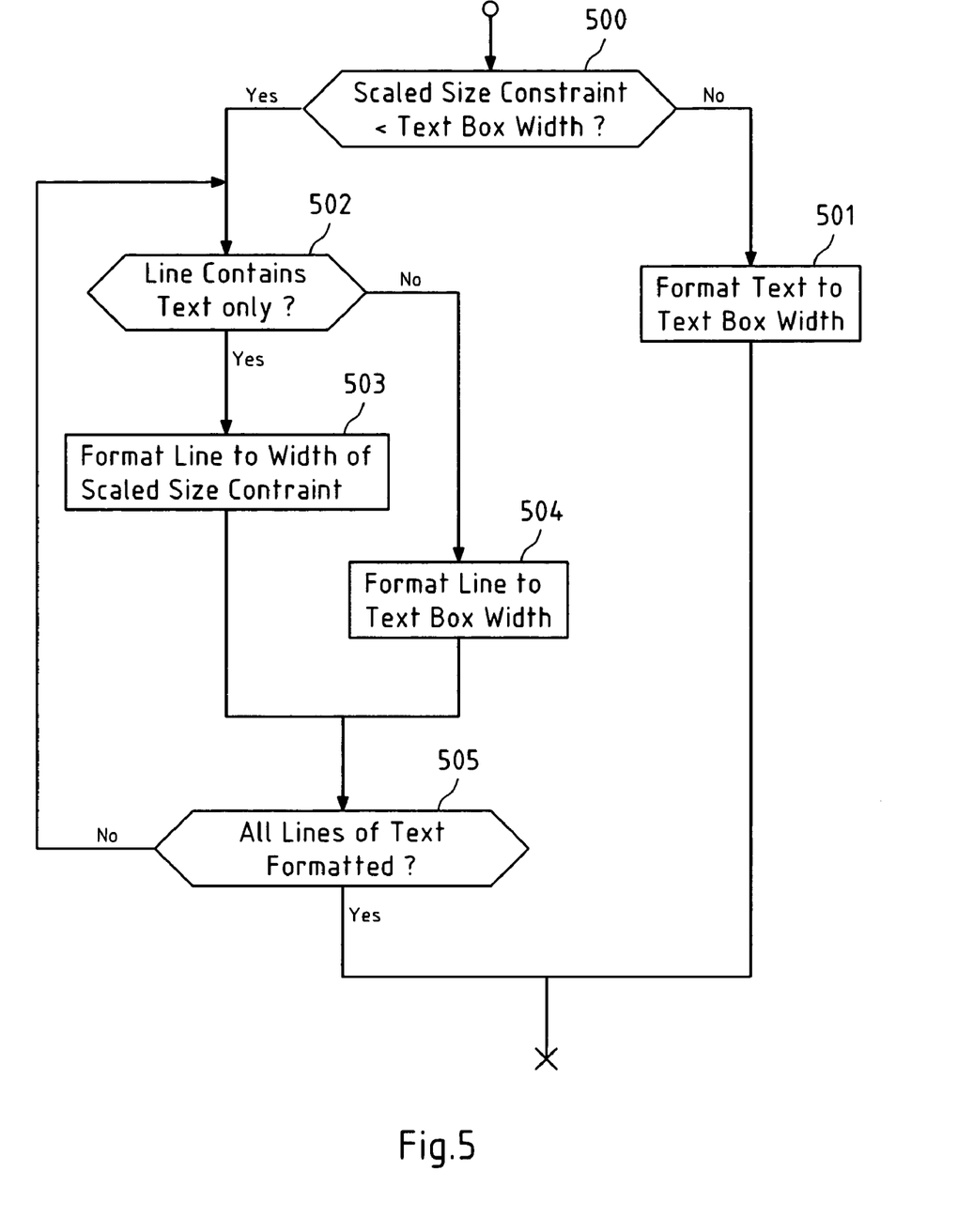
FIG. 5: a flowchart of a third embodiment of the present invention.

FIG. 5 depicts an exemplary flowchart of this third embodiment of the present invention. In a first step 500, it is checked if a width defined by said scaled size constraint (for instance the scaled width of the available display area) is smaller than a width of a text box that has been calculated for the text of a text element during the formatting process. If this is not the case, the text box is smaller than said width defined by said scaled size constraint, and thus formatting of the text to the width of the text box is performed in a step 501. The text in said text box forms a part of said formatting structure, and, after scaling of this formatting structure with said third scaling factor and displaying of said scaled formatting structure on the available display area, a representation of said text then can be read without requiring horizontal scrolling.

If said width defined by said scaled size constraint is smaller than said width of said text box, horizontal scrolling would be required when said text would be formatted to the text box width. Thus, instead, the text is line-wise formatted to the width defined by said scaled size constraint in steps 502 . . . 505. These multiple steps are required because only lines that purely contain text shall be formatted to the width defined by the scaled size constraint (step 503), whereas lines that contain other elements such as replaced elements (i.e. elements that will be replaced during the formatting process such as for instance images) are formatted to the text box width (step 504) to preserve the document layout. The check if a line contains text only is performed in step 502, and depending on the outcome of this check, steps 503 or 504 are executed. Step 505 controls if all lines of a text of a text element have been processed. If this is not the case, steps 502 . . . 505 are repeated again.

The strict demand that formatting lines of a text element to the width defined by the scaled size constraint (and thus breaking formatting models such as for instance the CSS2 formatting model) shall only be performed when said line contains pure text only (cf. step 502 of FIG. 5) can be relaxed by allowing also other elements than text in said lines. At least the following alternatives may be considered:

a) Only format a line to the width defined by the scaled size constraint if the line up to this potential break point is text or non-replaced inline elements (like the HTML anchor tag <a> or bold tag <b>), but not if the line contains replaced elements like images, inline tables, or similar elements.

b) Same as a), except allow a pre-defined number of replaced elements per line (e.g. one replaced element per line).

c) Same as a), except take into account the dimensions of replaced elements, for instance format a line to the width defined by the scaled size constraint if the sum width of all replaced elements in a line is below a pre-defined threshold.

d) Only format a line to the width defined by the scaled size constraint if the content of the parent block element in the document tree (for example a paragraph) is text or non-replaced inline content.

e) Same as d), except allow a pre-defined number of replaced elements (for example one replaced element per paragraph).

f) Same as d), except take into account the dimension of replaced elements (only format a line to the width defined by the scaled size constraint if the sum width of said replaced elements is smaller than a pre-defined value).

Figure 4B:
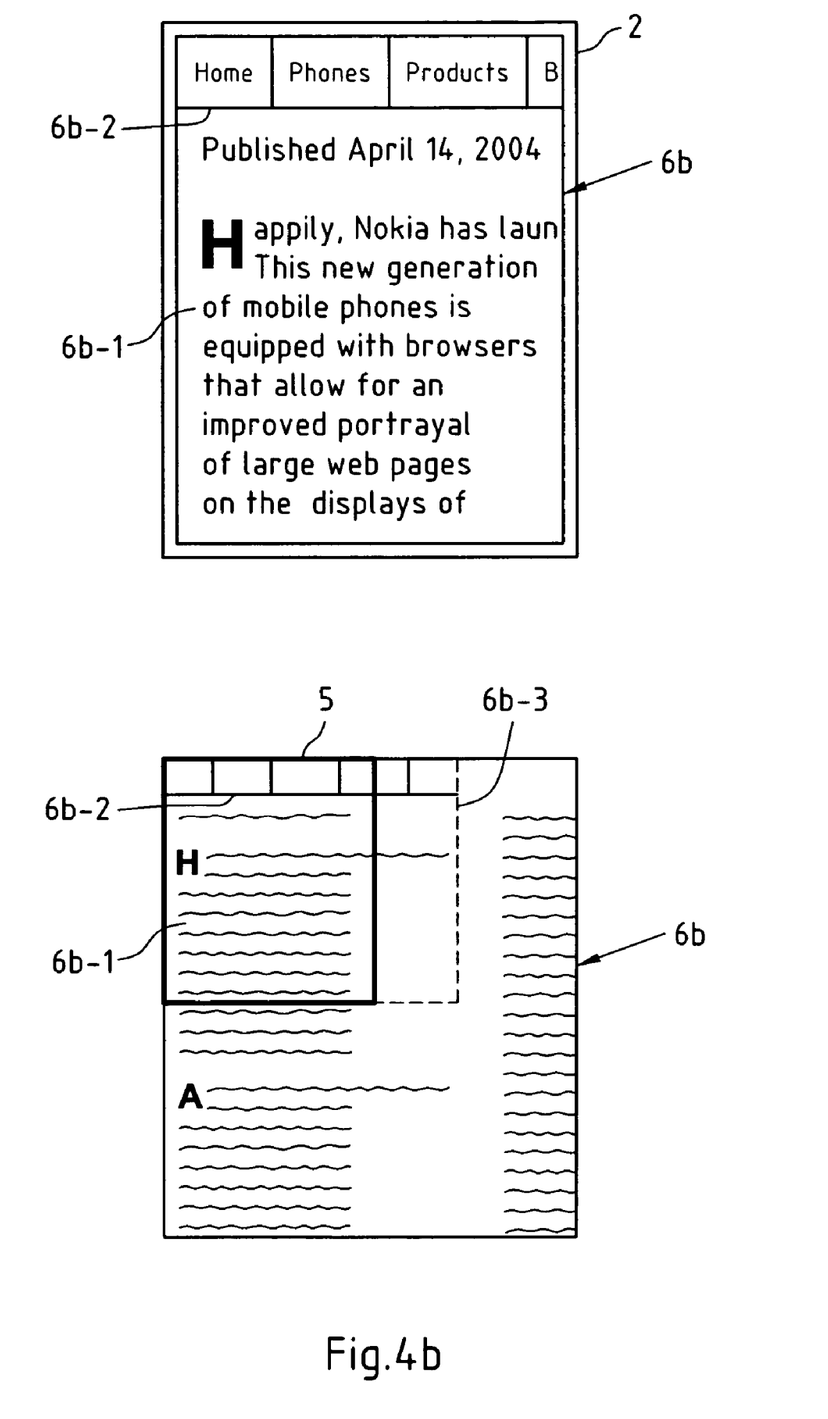
FIG. 4b: an exemplary illustration of the displaying of a scaled formatting structure with a text element formatted according to a third embodiment of the present invention.

FIG. 4b illustrates the improvements that can be achieved by applying the third embodiment of the present invention when formatting the same document as in FIG. 4a. The upper part of FIG. 4b depicts a portion 6b-1 of the corresponding scaled formatting structure 6b generated by a formatting process according to the third embodiment of the present invention. Once again, the lower part of FIG. 4b illustrates the complete scaled formatting structure 6b in small scale, wherein the portion 6b-1 that is displayed in the available display area 2 of the display in the upper part of FIG. 4b is indicated by the bold frame 5. As in FIG. 4a, said scaled formatting structure 6b contains the navigation element 6b-2, which causes a wide left column in said scaled formatting structure 6b (cf. the small-scale representation of said scaled formatting structure 6b in the lower part of FIG. 4b). Correspondingly, for the text element (corresponding to said portion 6b-1) below said navigation element 6b-2, a text box 6b-3 (in dashed fashion) is created with a width that is larger than the width of the available display area 2. According to the third embodiment of the present invention, it is detected that the width of said text box 6b-3 is larger than a width defined by the scaled size constraint (in this case, the scaled width of the available display area, i.e. the width of bold frame 5), and the formatting of the text is performed to said width defined by said scaled size constraint and not to said text box width.

For the example of FIG. 4b, it was assumed that the steps of the flowchart of FIG. 5 were obeyed when formatting the text element. Thus the second line of said portion 6b-1, which contains an image element "H", is not formatted to the width defined by said scaled size constraint, but to the width defined by said text box width, so that horizontal scrolling is required to read this line (cf. FIG. 4b). As already indicated above, also a formatting of this line to the width defined by said scaled size constraint can be achieved by slightly altering the flowchart of FIG. 5.

In the third embodiment of the present invention as described above with reference to FIG. 5 and illustrated in FIG. 4b, it was assumed that this third embodiment is set on top of said first embodiment (and possibly said second embodiment), i.e. that the size constraint is first scaled by a first scaling factor (consisting of a fourth and fifth scaling factor in case of the second embodiment), that the font sizes are scaled by a second scaling factor and that the formatting structure is then scaled by a third scaling factor. However, it is readily understood that the core idea of this third embodiment of the present invention, i.e. to format text to the width defined by the scaled size constraint if the width of the text box calculated for the text of a text element is larger than the width defined by said scaled size constraint, can also be applied if no scaling in the sense of the first embodiment (and possibly the second embodiment) of the present invention is performed at all as it is the case in prior art (corresponding to the case when the second, third and fourth scaling factors are equal to one). Equally well, the third embodiment of the present invention can also be combined with the second embodiment of the present invention only, i.e. without requiring application of the first embodiment of the present invention.

Document formatting according to the embodiments of the present invention described above tries to guarantee that no text column is wider than the available display area. As a result, in devices with small available display areas, columns may become quite narrow. As a further result, the amount of lines needed to display a given text may increase dramatically. Since state-of-the-art browsers break lines of text on a word border basis, i.e. perform a wrapping around of text after the last word added to a line if adding a further word would exceed the width of the box into which the text is to be fitted, this increases the amount display area wasted for the empty space at the end of lines. The effect is particularly significant with languages that use lots of long words (like for instance the Finnish language).

A fourth embodiment of the present invention thus proposes to improve display area efficiency by implementing text hyphenation. Since hyphenation adds more potential break points to a text, minimum width constraints of the text are reduced, and the flexibility and performance of document formatting in general is improved. Hyphenation allows to pack more information in the same screen area and thus increases the display area efficiency. As a direct result, the need to vertically scroll the scaled formatting structure displayed on the available display area can be significantly reduced. Furthermore, text appears more uniform (block-like), and readability improves.

Figure 6A:
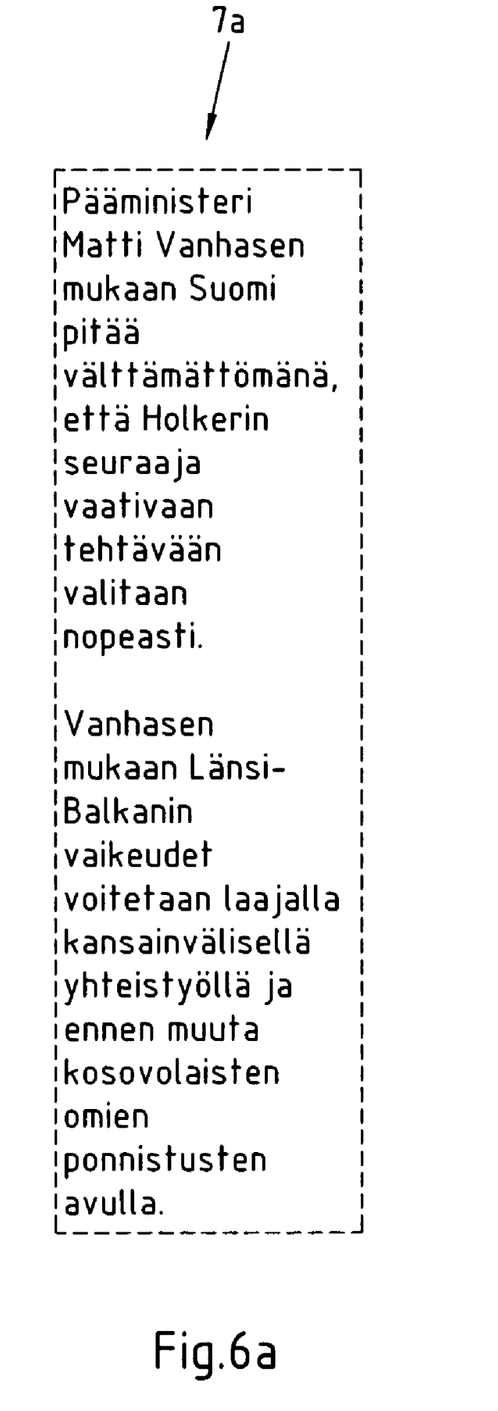
FIG. 6a: an exemplary illustration of a text of Finnish language being formatted into a text box without hyphenation.
Figure 6B:
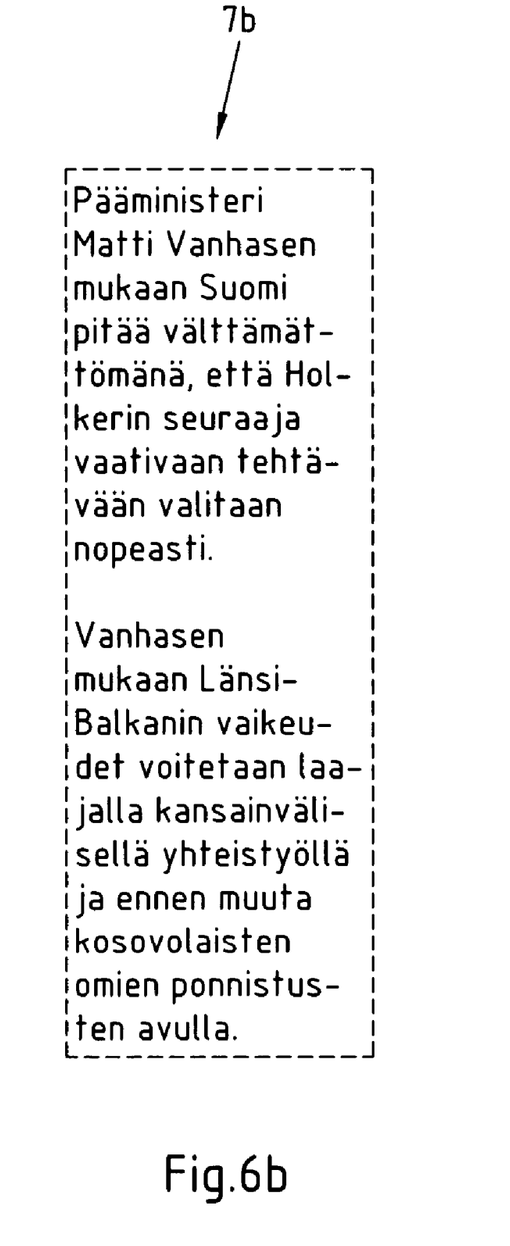
FIG. 6b: an exemplary illustration of the text of FIG. 6a being formatted into a text box with hyphenation according to a fourth embodiment of the present invention.

FIGS. 6a and 6b illustrate the reduction in text box height, the more uniform text appearance and the increased area efficiency that is achieved by performing hyphenation on a text element (that exemplarily comprises text in Finnish language) according to the fourth embodiment of the present invention.

In FIG. 6a, a Finnish text formatted to the width of a text box 7a without hyphenation is depicted. It can clearly be identified that the width of said box 7a, which is calculated during the formatting process, is determined by the word "välttämättömänä" in the fifth line of the text box 7a.

FIG. 6b depicts the same text being formatted to the text box 7b with hyphenation. It is readily seen that, with hyphenation, the text box 7b of FIG. 6b has a much smaller height than the text box 7*a* of FIG. 6*a*, while the width of both text boxes 7*a* and 7*b* is the same for comparison purposes.

Hyphenation in a browser of a hand-held multimedia device can be implemented either purely in the client side or as a server-assisted solution. In either case, implementation may need:

a language detection algorithm, and
a hyphenation algorithm for the detected language.
Reliable and fast algorithms exist for both tasks.

The language used in the text needs to be known to perform correct hyphenation. Web servers do not always inform the identity of the used language or they do not inform it correctly. Thus the entity that performs hyphenation may detect the used language used in a text based on a dictionary and then may perform hyphenation according to the detected language, even if it is a different one than informed by the server.

A server-assisted hyphenation may process the web document in a (proxy) server by automatically adding Unicode hyphenation marks to the potential hyphenation points in the document text. The browser or other document formatting instance then may use these hyphenation marks as hints to determine the actual line breaking points during the document formatting.

It should be noted that the application of hyphenation in the formatting process according to the fourth embodiment of the present invention is completely independent of the fact whether the first, second and/or third embodiment of the present invention is implemented in the formatting process or not. Hyphenation is inter-operable with all of the first three embodiments of the present invention described in this detailed description, but can also be integrated in any other prior art formatting method.

Figure 7:
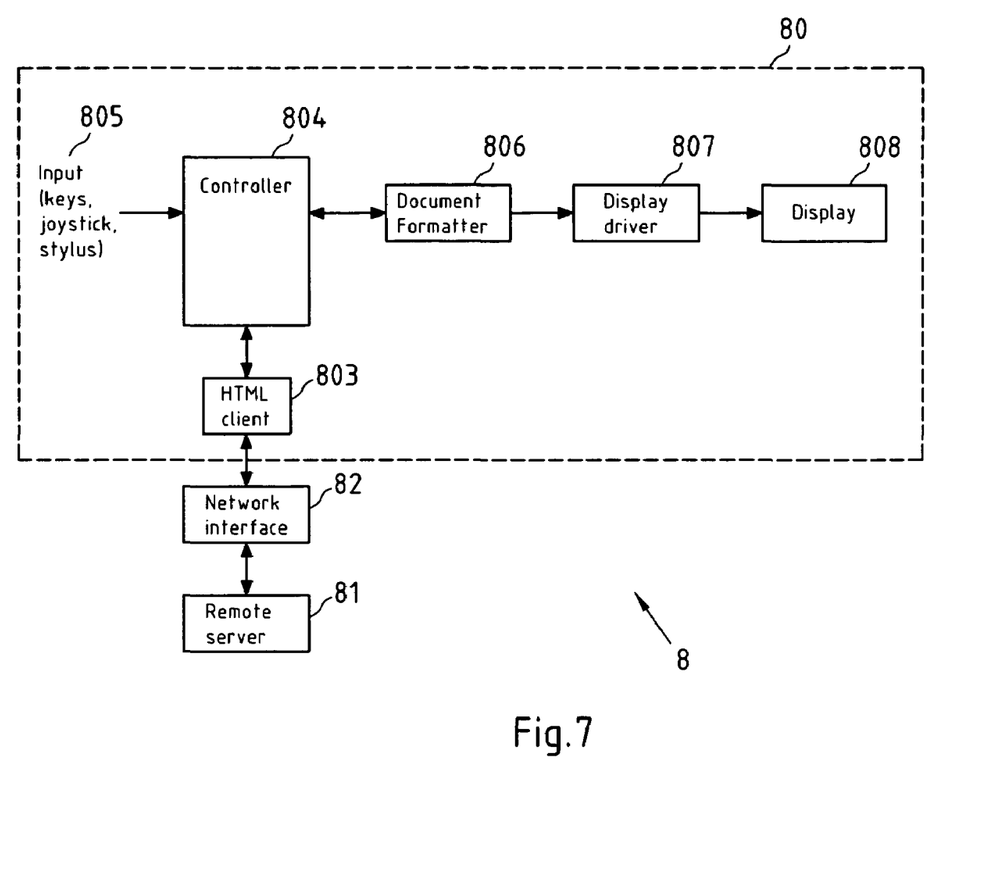
FIG. 7: an exemplary set-up of a system for displaying a document according to the present invention.

FIG. 7 depicts a system for displaying an object according to the present invention, wherein said system 8 comprises a device 80 (for instance a hand-held multimedia device, e.g. a mobile phone, a remote server 81, and a network interface 82. Objects, which are exemplarily assumed to be web documents (or internet pages) specified in HTML, are stored on said remote server 81, can be transferred via said network interface 82 and then be processed/displayed by said device 80. Therein, either said device 80 and/or said network interface 82 comprise means that implement the embodiments of the present invention.

The device 80 comprises the standard components required to implement a browser functionality: The controller 804 controls the function of the browser and receives input 805 from a user for example via the keyboard, touch-screen, mouse interaction, or voice commands, e.g. the address of a new HTML document that is to be loaded. The HTML client 803 provides services to the controller 804, in particular fetching of new HTML documents via the network interface 82, which is connected to remote server 81. If the device 80 is a hand-held multimedia device, said connection will usually be a wireless connection. The document formatter 806 is responsible for the interpreting of HTML documents and produces a scaled formatting structure that then can be displayed on the display 808 via a display driver 807. To this end, the Document formatter 806 parses the HTML source code of the HTML document, generates a document tree, retrieves style sheets associated with said document tree or the elements contained therein, annotates the elements in the document tree according to retrieved style sheets and generates a formatting structure from said annotated document tree, which formatting structure then is displayed on the available display area of the display 808.

According to the embodiments of the present invention, said device 80 further comprises means to scale a size constraint by a first scaling factor (which may be represented by a product of a fourth and a fifth scaling factor), to scale a text width of a text element with a second scaling factor, and to scale a formatting structure by a third scaling factor. These means may for instance be implemented in the document formatter 806 and/or the controller 804. Said device 80 may comprise means to adaptively determine some or all of said scaling factors depending on the document that is to be rendered, or may provide appropriate interaction functionality 805 that allows a user to input or modify said scaling factors. Said device 80 may further comprise means for detecting if a width of a text box that has been calculated for a text of a text element is larger than a width defined by a scaled size constraint, and to format said text to the width defined by said scaled size constraint or to the text box width, accordingly. Said device 80 may further comprise means for performing hyphenation on texts of text elements.

It should be noted that the functionality that is provided by the device 80 may also be at least partially provided by the network interface 82, which could analyze HTML documents during their transfer from the remote server 81 to the device 80. For instance, hyphenation marks may be added to the text of text elements of the HTML document in said network interface 82, which hyphenation marks then may be exploited by said document formatter 806 when formatting text in order to decide when lines of text are wrapped around best.

The invention has been described above by means of exemplary embodiments. It should be noted that there are alternative ways and variations which are obvious to a skilled person in the art and can be implemented without deviating from the scope and spirit of the appended claims. In particular, the deployment of the embodiments of the present invention is not limited to browsers that render HTML documents associated with CSS2 style sheets on a display only. Instead, the present invention can be applied in each context where objects that comprise text elements have to be displayed in any way, be it on a display, or via projection instance such as a beamer, or any other display device. Said objects may also be 3D objects.

What is claimed is:

1. A method comprising:
    scaling a constraint to obtain a scaled constraint, wherein said constraint affects a formatted object that is to be obtained from an object, which comprises a plurality of elements, by formatting;
    scaling at least one of said elements to obtain a scaled element;
    generating a layout structure for said plurality of elements including said scaled element under consideration of said scaled constraint; and
    scaling said layout structure to obtain said formatted object, wherein a scaling factor representing said scaling of said constraint is greater than a reciprocal of a scaling factor representing said scaling of said layout structure.

2. The method according to claim 1, wherein said generating of said layout structure comprises:
    determining a boundary for said scaled element;
    checking if a dimension of said boundary violates a limit defined by said scaled constraint; and
    formatting a content of said scaled element to said limit defined by said scaled constraint, if said dimension of said boundary violates said limit defined by said scaled constraint.

3. The method according to claim 1, wherein said generating of said layout structure is at least partially defined by a style sheet.

4. The method according to claim 1, wherein said object is a document, and wherein said elements of said document are defined by a markup language.

5. The method according to claim 1, wherein scaling said constraint to obtain a scaled constraint comprises scaling said constraint by a first scaling factor, wherein scaling said at least one of said elements comprises scaling said at least one of said elements by a second scaling factor, and wherein scaling said layout structure comprises scaling said layout structure by a third scaling factor.

6. The method according to claim 5, wherein said first and second scaling factors are larger than one, and wherein said third scaling factor is smaller than one.

7. The method according to claim 5, wherein said first and second scaling factors are substantially equal, and wherein said third scaling factor is substantially a reciprocal value of said first scaling factor.

8. The method according to claim 5, wherein in said generating of said layout structure, a hyphenation algorithm is applied to a text contained in said at least one element that is scaled by said second scaling factor.

9. The method according to claim 5, wherein said first scaling factor is a product of a fourth and a fifth scaling factor, and wherein said fourth scaling factor is substantially a reciprocal value of said third scaling factor.

10. The method according to claim 9, wherein if there are horizontally overflowing text boxes in said scaled formatted object after the formatting process, a larger value for said fifth scaling factor is chosen and said scaled formatted object is reformatted.

11. An apparatus comprising:
means arranged for scaling a constraint to obtain a scaled constraint, wherein said constraint affects a formatted object that is to be obtained from an object, which comprises a plurality of elements, by formatting;
means arranged for scaling at least one of said elements to obtain a scaled element;
means arranged for generating a layout structure for said plurality of elements including said scaled element under consideration of said scaled constraint; and
means arranged for scaling said layout structure to obtain said formatted object, wherein a scaling factor representing said scaling of said constraint is greater than a reciprocal of a scaling factor representing said scaling of said layout structure.

12. The apparatus according to claim 11, wherein said means arranged for scaling said constraint are arranged for scaling said constraint by a first scaling factor, wherein said means arranged for scaling said at least one of said elements are arranged for scaling said at least one of said elements by a second scaling factor, and wherein said means arranged for scaling said layout structure are arranged for scaling said layout structure by a third scaling factor.

13. The apparatus according to claim 12, wherein said first scaling factor is a product of a fourth and a fifth scaling factor, and wherein said fourth scaling factor is substantially a reciprocal value of said third scaling factor.

14. The apparatus according to claim 13, wherein said processor is further configured to choose a larger value for said fifth scaling factor and reformat if there are horizontally overflowing text boxes in said scaled formatted object after the formatting process.

15. A computer-readable storage medium encoded with instructions that, when executed by a computer, perform the method steps of claim 1.

16. The computer-readable storage medium according to claim 15, wherein said instructions are related to a browsing application or to a part thereof.

17. An apparatus comprising
a processor configured to scale a constraint to obtain a scaled constraint, wherein said constraint affects a formatted object that is to be obtained from an object, which comprises a plurality of elements, by formatting,
said processor being further configured to scale at least one of said elements to obtain a scaled element,
said processor being further configured to generate a layout structure for said plurality of elements including said scaled element under consideration of said scaled constraint, and
said processor being further configured to scale said layout structure to obtain said formatted object, wherein a scaling factor representing said scaling of said constraint is greater than a reciprocal of a scaling factor representing said scaling of said layout structure.

18. The apparatus according to claim 17, wherein said apparatus is a mobile phone or a part thereof.

19. The apparatus according to claim 17,
wherein said processor is further configured to determine a boundary for said scaled element,
wherein said processor is further configured to check if a dimension of said boundary violates a limit defined by said scaled constraint,
and wherein said processor is further configured to format a content of said scaled element to said limit defined by said scaled constraint, if said dimension of said boundary violates said limit defined by said scaled constraint.

20. The apparatus according to claim 17, wherein said processor is further configured to generate said layout structure as at least partially defined by a style sheet.

21. The apparatus according to claim 17, wherein said object is a document, and wherein said elements of said document are defined by a markup language.

22. The apparatus according to claim 17, wherein the processor being configured to scale said constraint to obtain a scaled constraint comprises being configured to scale said constraint by a first scaling factor, wherein being configured to scale said at least one of said elements comprises being configured to scale said at least one of said elements by a second scaling factor, and wherein being configured to scale said layout structure comprises being configured to scale said layout structure by a third scaling factor.

23. The apparatus according to claim 22, wherein said first and second scaling factors are larger than one, and wherein said third scaling factor is smaller than one.

24. The apparatus according to claim 22, wherein said first and second scaling factors are substantially equal, and wherein said third scaling factor is substantially a reciprocal value of said first scaling factor.

25. The apparatus according to claim 22, wherein said processor is further configured to apply a hyphenation algorithm to a text contained in said at least one element that is scaled by said second scaling factor.

26. The apparatus according to claim 22, wherein said first scaling factor is a product of a fourth and a fifth scaling factor, said fourth scaling factor is substantially a reciprocal value of said third scaling factor and said fifth scaling factor is larger than one.

* * * * *